July 29, 1952
R. SHATKIN
2,605,139
ATOMIZER
Filed Sept. 15, 1947
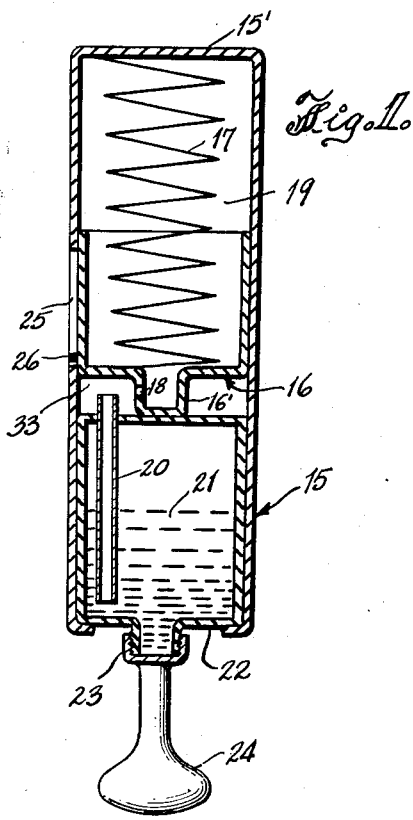
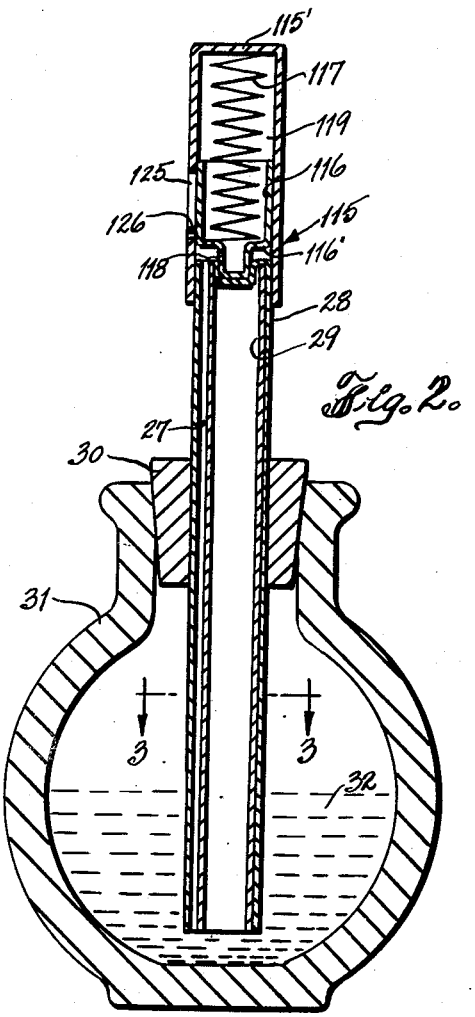
RUBIN SHATKIN,
INVENTOR.
BY
ATTORNEY Patented July 29, 1952

2,605,139

UNITED STATES PATENT OFFICE 2,605,139

ATOMIZER

Rubin Shatkin, Brooklyn, N. Y., assignor to Crest Silver Mfg. Co. Inc., Matawan, N. J., a corporation of New Jersey Application September 15, 1947, Serial No. 774,082

1 Claim. (Cl. 299—88)

The present invention relates to atomizers and more particularly to the portable type to be carried in hand bags, or to be mounted on perfume bottles or other containers of liquids to be sprayed in small doses.

An object of this invention is to provide a novel and improved atomizer which is made up of a minimum of parts of simple construction and assembly, cheap to manufacture, easy to use and efficient in carrying out the purposes for which it is designed.

Other objects and advantages will become apparent as this disclosure proceeds.

In the accompanying drawings forming part of this specification, similar characters of reference indicate similar parts in all the views.

Fig. 1 is a central longitudinal section of an atomizer constructed in accordance with the teachings of this invention. This shows the portable type including a tank as one of its components. If desired, the article can be made the size of an ordinary lip-stick.

Fig. 2 is a similar view of a modified embodiment of this invention adapted for mounting onto a bottle of perfume or other container.

Fig. 3 is a section taken at line 3—3 in Fig. 2.

Essentially the article comprises a sort of bellows of very simple construction, adapted to discharge a "pencil" gust of air across one end of a tube, whose other end is immersed in a liquid, as a perfume, medicine or the like, to accomplish atomizer action. The bellows are so constructed that upon operation thereof, an opening in the casing which is normally closed, presents itself in open position through which a liquid spray may pass from said tube.

In the drawings, the numeral 15 designates generally a tubular casing which is closed at its upper end 15'. Within said casing, and in airtight, telescopically slidable relation therewith, is a comparatively short tubular shell indicated generally by the numeral 16, having a closed reduced end portion 16', which latter is most remote from the closed end 15' of the casing 15. A compression spring coil 17, housed within said casing and shell, maintains the rim of the mouth of said shell 16 spaced from the closed end 15' of the casing. The longitudinal wall of the reduced end portion 16' of the shell 16, has a small aperture 18, therethrough, wherefrom is discharged a "pencil" of wind upon movement of shell 16 towards end 15' of the casing 15, so as to compress the spring 17, that is, upon decrease of the volumetric dimension of the chamber 19. The gust of air issuing from said discharge orifice 18, is in a direction lateral of the longitudinal line of casing 15, and across the top end of the tube 20, of comparatively small bore, which tube extends immersed in liquid 21, housed in tank or container 22.

The casing 15 is provided with a longitudinal slot 25, through which spray from tube 20 may pass to the exterior for use; said slot 25 being in line with the wind gust from orifice 18. If the casing 15 and the shell 16 are cylindrical, they may be maintained against relative axial movement by means of a pin 26, extending from the shell 16 and into said slot for sliding contact with the longitudinal edges of said slot.

Said pin 26 may also serve to limit the relative movement of casing 15 and shell 16, as may be determined by suitable length and position of the slot 25. The shell 16 rests on, or may be suitably mounted on the container 22. The latter is refillable upon removal of its cap, by means of a handle 24. The above description is of the embodiment shown in Fig. 1.

Those parts included in the embodiment illustrated in Fig. 2, which are identical in structure, relationship and function to parts included in the article shown in Fig. 1, have been designated by like numerals, increased by one hundred, respectively. Differences will now be noted.

In place of tube 20, a duct 27 is provided by having a pair of concentrically closely fitted contacting tubes 28 and 29, the inner one of which has a longitudinal inwardly extending channel 29'. The upper end of said inner tube is closed and depressed, so that discharge orifice 118 is closely above the open end of the duct 27. The tube structure of 28 and 29, is positioned upright through a suitable cork 30 and air tight therewith. Said cork closes the mouth of a bottle of container 31 holding a liquid 32, into which the duct 27 extends. Vent holes in the containers are not shown, as such are well known in the art.

In operation, referring to Fig. 1, where the atomizer is shown in rest condition, handle 24 is held in hand, or rested as a pedestal on a table. Casing 15 is manually shifted downward, whereby spring 17 is stressed, a pencil of air is forced out of orifice 18, and slot or opening 25 is opened for direct communication with chamber 33, and a spray of liquid is caused to issue from tube 20, and directed by the wind gust from orifice 18, out through the said opening 25, for use. All these occurrences are simultaneous. Slot 25 may be of substantial width so as not to intercept the spray. Upon release of hold or pressure on the casing 15, it will automatically rise due to action of the spring 17, to initial position, where pin 26 is stopped by the end of slot 25. For good operation, the casing 15 is given a fairly rapid reciprocatory movement. The embodiment illustrated in Fig. 2, is operated in similar fashion.

This invention is capable of numerous forms and various applications without departing from the essential features herein disclosed. It is therefore intended and desired that the embodiments herein shown shall be deemed illustrative and not restrictive and that the patent shall cover all patentable novelty herein set forth; reference being had to the following claim rather than to the specific description herein to indicate the scope of this invention.

I claim:

In an atomizer of the character described, a pair of tubular shells positioned with the mouth of one within the mouth of the other at commencement of entrance of one into the other, and in slidable telescopic relation with each other, co-operative means on said shells maintaining them together, spring means within said shells adapted to normally maintain them in extended condition; the outer shell being longer than the inner shell and the closed end of the inner shell being of reduced size, and the outer shell being provided with a longitudinal slot, normally closed by the inner shell when the shells are in their relative extended rest position, and opened when the shells are moved to decrease the collapsible chamber formed by said shells, a container for liquid to be sprayed and a member comprising a pair of concentrically contacting tubes in air-tight relation; the inner tube of such member being formed with an inwardly extending longitudinal channel whereby a duct is formed between such pair of tubes; the said member having one of its ends extending into said container and having its other end adjacent the slot through the outer shell and the reduced end of the inner shell and secured to said reduced end of the inner shell on the inner tube of said member; the reduced end of the inner shell being provided with a discharge aperture adapted for the passage of a gust of air therethrough and across the end of the duct and out of the outer shell through the slot in the latter upon movement of the shells relatively to one another whereby the collapsible chamber formed by them is decreased.

RUBIN SHATKIN.

REFERENCES CITED

The following references are of record in the file of this patent:

UNITED STATES PATENTS

| Number | Name | Date |
|---|---|---|
| 1,655,678 | Dorment | Jan. 10, 1928 |
| 2,162,756 | Seyforth | June 20, 1939 |
| 2,176,642 | Seyforth | Oct. 17, 1939 |
| 2,213,846 | Meyer | Sept. 3, 1940 |
| 2,266,767 | Linden et al. | Dec. 23, 1941 |
| 2,296,773 | Daggett | Sept. 22, 1942 |

FOREIGN PATENTS

| Number | Country | Date |
|---|---|---|
| 209,581 | Great Britain | Jan. 17, 1924 |
| 428,278 | Great Britain | May 9, 1935 |
| 595,247 | France | Sept. 29, 1925 |
| 641,076 | France | July 27, 1928 |
| 697,421 | France | Oct. 28, 1930 |